United States Patent

[11] 3,576,372

| [72] | Inventor | James W. Baker |
| | | East Lansing, Mich. |
| [21] | Appl. No. | 800,404 |
| [22] | Filed | Feb. 19, 1969 |
| [45] | Patented | Apr. 27, 1971 |
| [73] | Assignee | FMC Corporation |
| | | San Jose, Calif. |

[54] WHEEL ALIGNER PROJECTOR WITH DAMPING MECHANISM
7 Claims, 4 Drawing Figs.

[52] U.S. Cl. .................................................... 356/155, 33/46.2
[51] Int. Cl. ..................................................... G01b 11/26
[50] Field of Search ......................................... 356/155, 154, 149, 250; 33/46.2, 70 (E), 73 (D)

[56] References Cited
UNITED STATES PATENTS

| 2,347,702 | 5/1944 | Maris | 356/154 |
| 3,055,264 | 9/1962 | Hunter | 356/155 |

*Primary Examiner*—Ronald L. Wibert
*Assistant Examiner*—J. Rothenberg
*Attorneys*—F. W. Anderson and C. E. Tripp ABSTRACT: A projector, which mounts on the front wheel of a vehicle, projects the image of a reference mark during alignment of the wheels. The reference mark is mounted on a pendulum which swings in front of a lamp to give, in conjunction with the projected image of reference indicia which is fixed in the projector, an indication of the tilt of the projector and the wheel on which it is mounted. The pendulum has an aluminum portion which swings through the magnetic field established by opposite, spaced apart, pole faces of a permanent magnet. The motion of the nonmagnetic, current-conducting pendulum portion through the magnetic field induces currents in the pendulum portion which damps the motion of the pendulum.

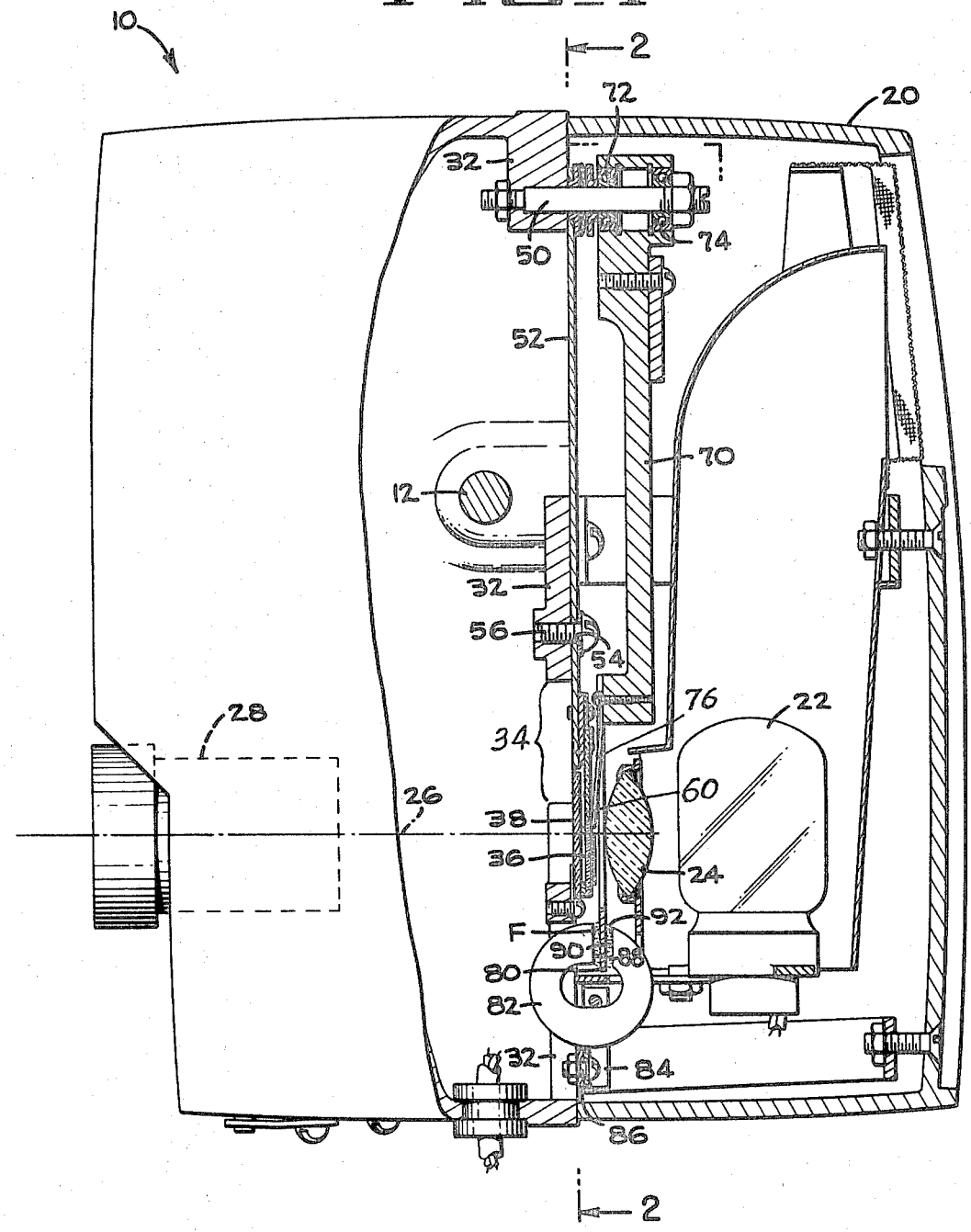

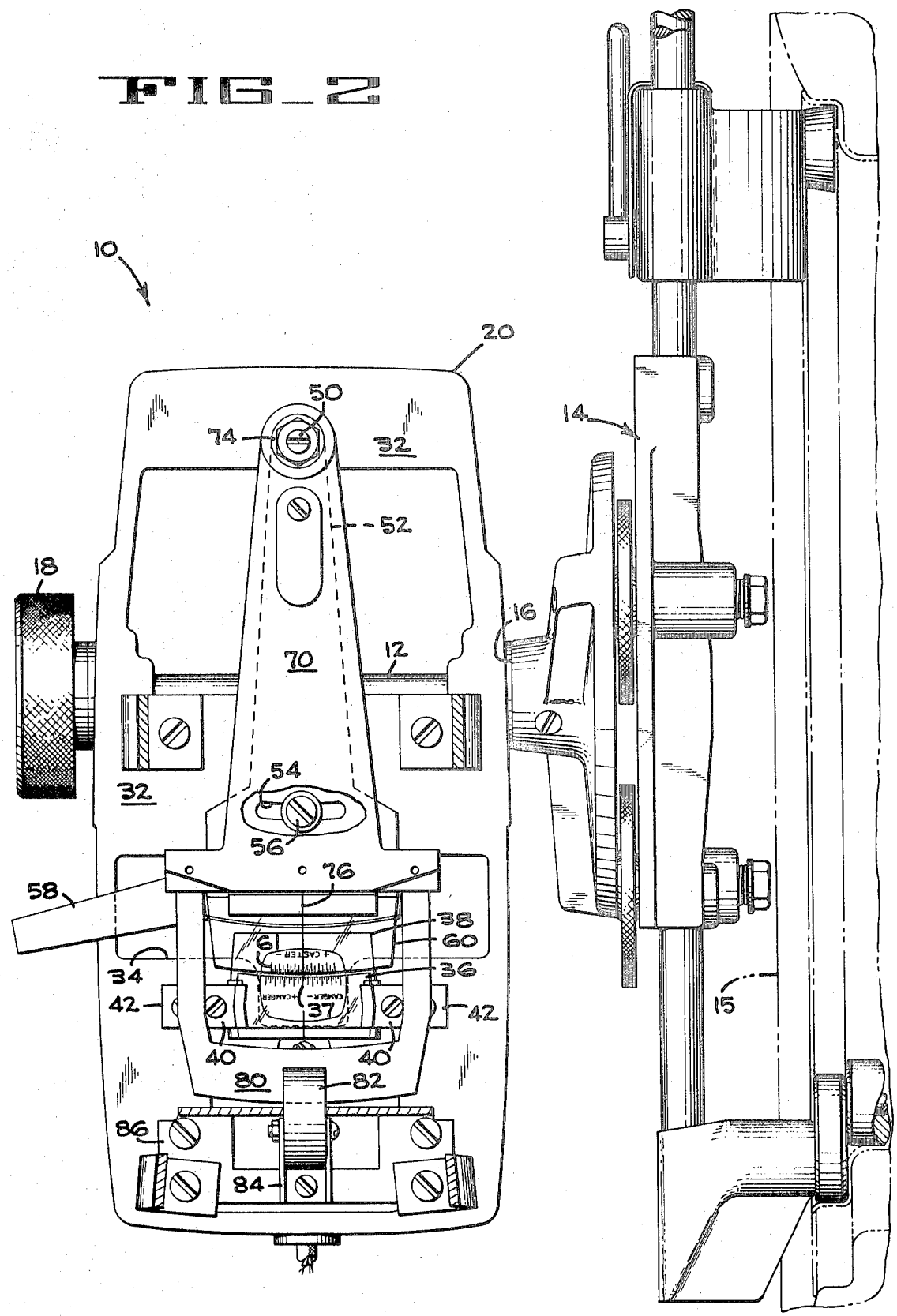

FIG_3
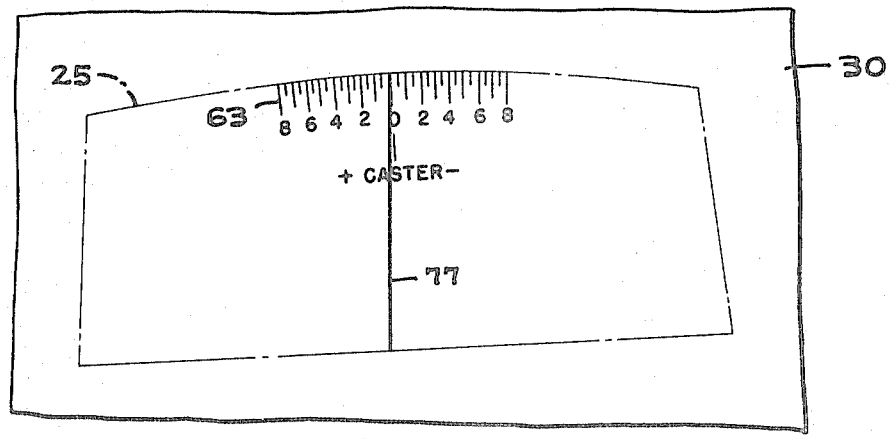
FIG_4
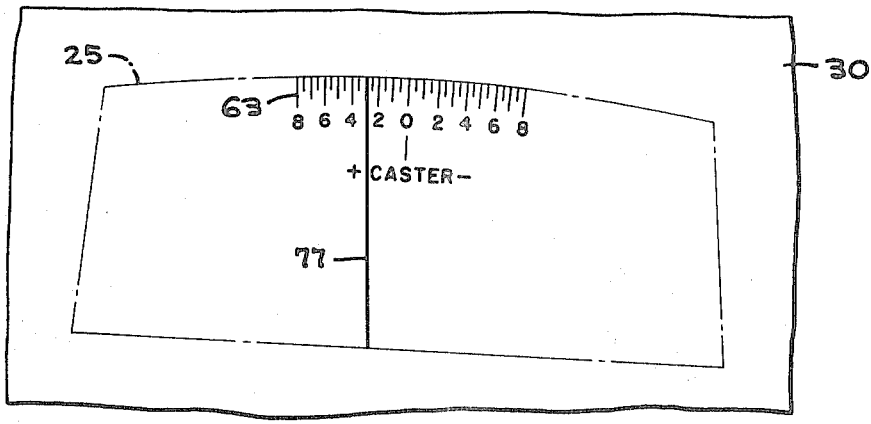

1

WHEEL ALIGNER PROJECTOR WITH DAMPING MECHANISM

BACKGROUND OF THE INVENTION

In one type of projector used for measuring alignment of the wheels of a vehicle, a pendulum is utilized to indicate the extent the projector, and hence the vehicle wheel to which it is attached, is tilted. For example, in measuring caster (the backward or forward tilt of the steering pivot axis) it is common to measure camber (the inward or outward tilt of the wheel at the top) with the wheels turned first to one side and then the other. The difference in the camber at these two points is then used as an indication of caster.

One of the problems with a projector having a pendulous indicator, particularly when measuring caster, is that the pendulum, which must be free to swing, will swing as the wheel and projector is turned and then continue oscillating after the wheel is in the desired position. No measurement, of course, can be made until the pendulum stops oscillating, and adjustment of the alignment of the wheels must be delayed until the pendulum comes to rest.

SUMMARY OF THE INVENTION

In the present invention, mechanism is provided to dampen the oscillations of the pendulum without, in any way, binding the pendulum in a manner to prevent it from coming to a true vertical position at rest. The damping force is a function of the speed of swinging movement so that, as the pendulum comes to rest, the force restricting the swinging movement is reduced to zero to permit the pendulum to assume a true vertical position. In the preferred form of the invention, a permanent magnet is provided having opposite, spaced-apart, pole faces defining a gap therebetween. The pendulum has an aluminum plate portion which is received in the gap, and received in the magnetic field spanning the gap. As the pendulum swings, eddy currents are generated in the aluminum plate which creates a damping, or retarding, force on the pendulum. As the pendulum slows down, the retarding force diminishes, until, when the pendulum comes to rest, the retarding force disappears. Thus, the pendulum comes to rest in a true vertical position.

It is therefore one object of the present invention to provide wheel aligning apparatus which quickly gives a true alignment reading. It is another object of the present invention to provide a quickly dampened vehicle wheel alignment measuring device. It is yet another object of the present invention to provide a wheel aligning projector with a pendulum indicator which hangs freely without friction, in a true vertical position, but which when oscillating quickly comes to rest to give an accurate reading.

BRIEF DESCRIPTION OF THE DRAWINGS

FIG. 1 is a side view, partially in cross section, of a wheel aligning projector embodying the present invention;

FIG. 2 is a view taken substantially on the line 2—2 of FIG. 1; and

FIGS. 3 and 4 are views of the target screen during a caster measurement showing, for clarity and simplification of the drawing, a projected image of the pointer and the caster scale only.

DESCRIPTION OF THE PREFERRED EMBODIMENT

There is shown in FIG. 1 a projector 10 received on a shaft 12 extending from a clamp 14 (FIG. 2) which is secured to the front wheel 15 of an automobile. The projector is tightly gripped between a face 16 on clamp 14 and an internally threaded knob 18 when the knob is tightened on the outer threaded portion of shaft 12.

The projector has a housing 20 in which a lamp 22 is mounted. A condensing lens 24 directs light in a beam 25 from the lamp along a path 26 through a focusing lens 28 to a target screen 30 located approximately 6 feet in front of the projector.

2

An intermediate wall 32 in the housing 20 has an opening 34 through which the light from lamp 22 passes. Three reticles, each having a scale marked thereon, are mounted in the opening 34. Two of the reticles are fixed in the housing. A camber reticle 36, having a scale 37 marked thereon, is mounted in opening 34 by clips 40. A toe reticle 38, having a scale (not shown) marked thereon is mounted in opening 34 in front of camber reticle 36 by clips 42.

The third reticle is movably mounted in the projector. A stub shaft 50 is mounted in wall 32 at the top of the housing, and a depending arm 52 is pivotally mounted thereon. The arm 52 has a slot 54 therein which receives a screw 56 threadedly received in wall 32. The screw is tight enough to hold arm 52 in a selected position, but is loose enough to permit the arm 52 to be angularly adjusted by the operator by means of the lateral handle 58 attached to arm 52. A caster reticle 60, having a scale 61 marked thereon, is secured to the lower end of arm 52 and extends into the opening 34 in the same plane as the camber reticle 36.

A pendulum 70 is mounted on stub shaft 50 by means of ball bearings 72, 74. The antifriction bearings assure that the pendulum will always hang absolutely vertical when it comes to rest. A thin wire 76, defining a reference mark, is connected to and hangs down from the pendulum to constitute a pointer for the scales marked on the reticles 36, 38, and 60. The images of the pointer and scales are projected from the projector to screen 30. Since the scales are either fixed in the projector, or are held in an adjusted position, while the pointer 76 is free to assume a vertical position, the scales and pointer constitute reference indicia which indicate the tilt of the projector, and hence the tilt of the wheel to which the projector is connected.

For example, in measuring caster of the front wheels of a vehicle, the wheels are turned a certain amount in one direction (say 20°). Considering one of the wheels only, the projector thereon will tilt when the wheel is turned, and when the pendulum 70 comes to rest, the image 77 of the pointer 76 will be vertical (as it always is at rest). At this time, the operator will adjust handle 58 to set the zero mark on the image 63 of the caster scale 61 at zero, as shown in FIG. 3. After this adjustment has been made, the wheel is turned 20° in the opposite direction. In this second position, the projector will be tilted to a different extent by virtue of the caster of the wheel. Thus, the pointer, which again assumes a vertical position, will indicate a reading other than zero on the caster scale, as shown in FIG. 4. It is this second reading which gives the caster of the wheel.

In caster measurement, and in other wheel alignment measurements, the projector is usually moved or tilted just before a reading must be taken. Thus, the pendulum 70, which swings freely on shaft 50, will frequently begin to oscillate, and a reading must be delayed until the pendulum comes to rest.

To quickly bring the pendulum to rest, without applying friction which might stop the pendulum on one side or the other of the true vertical, the pendulum has been provided with a depending U-shaped, aluminum plate 80. A permanent magnet 82 is secured, by clip 84, to bracket 86 which is connected to wall 32. The magnet 82 has two faces 88, 90 of opposite polarity which are spaced apart a small distance to define a gap 92 therebetween. A permanent magnetic field F is established in the gap. The aluminum plate 80 extends into gap 92, and into the magnetic field F therein, in any angular position of pendulum in the housing. The aluminum plate, which is nonmagnetic, is not gripped by the magnet.

As the aluminum plate, which is an electrical conductor, moves through the field F, eddy currents are induced in the plate, a portion only of which is between the two pole faces 88, 90. The eddy currents in the plate circulate through the field, and beyond the region between the pole faces. In accordance with Lenz's law, and by virtue of the eddy current paths both close to and remote from the center of the magnetic field, a net force is exerted on the aluminum plate opposing the motion of the plate through the field. This opposing, restricting force is greatest when the speed of the plate is greatest, and diminishes as the speed of the plate diminishes. Thus, the free swinging pendulum will come to rest quickly, and since the thrust on the pendulum plate disappears as that plate comes to rest, the pendulum will hang in a true vertical position to give an accurate indication of the extent of the tilt of the projector, and hence the tilt of the wheel.

Although the best mode contemplated for carrying out the present invention has been herein shown and described, it will be apparent that modification and variation may be made without departing from what is regarded to be the subject matter of the invention.

I claim:

1. A projector for projecting the image of reference indicia to indicate the alignment of the wheel of a vehicle, the projector comprising a housing for mounting on the wheel and including therewithin the combination comprising a lamp, an indicating member movable along a path in front of the lamp and having reference indicia thereon for projection, said indicating member having at least a portion made of electrical conducting material, and means establishing a magnetic field in the path of said portion of the indicating member to create eddy currents in said portion as said portion moves through the magnetic field to dampen the movement thereof.

2. The projector of claim 1 in which said indicating member is made of nonmagnetic material.

3. The projector of claim 2 in which said indicating member is made of aluminum.

4. A projector for projecting reference indicia to indicate the alignment of the wheel of a vehicle, the projector comprising a housing for mounting on the wheel and including therewithin the combination comprising a lamp to cast an image along a path, a magnet to produce a magnetic field, a pendulum having reference indicia in said path, said pendulum swingable with respect to the housing when the projector is tilted, said pendulum having a nonmagnetic, current-conducting portion in said magnetic field to carry eddy currents in said portion as said portion moves through the magnetic field to dampen the swinging movement of the pendulum with respect to the housing.

5. The projector of claim 4 in which said magnet is a permanent magnet.

6. The projector of claim 4 including means mounted in the housing to indicate in conjunction with the reference indicia on said pendulum the amplitude of the swinging movement of the pendulum relative to the housing as the projector is moved from one position to another.

7. A projector for projecting reference indicia to indicate the alignment of the wheel of a vehicle, the projector comprising a housing for mounting on the wheel and including therewithin the combination comprising a lamp, a lens to direct light from the lamp along a path, a permanent magnet having opposite poles spaced apart in face-to-face relation to define a gap therebetween, a pendulum having reference indicia in said path, said pendulum swingable with respect to the housing when the projector is tilted from one position to another, said pendulum having a nonmagnetic, current-conducting portion received in said gap to carry eddy currents in said portion as said portion moves through the magnetic field to dampen the swinging movement of the pendulum, and an adjustable indicating member to indicate in conjunction with the reference indicia on said pendulum the extent of swinging movement of the pendulum relative to said housing.